UNITED STATES PATENT OFFICE.

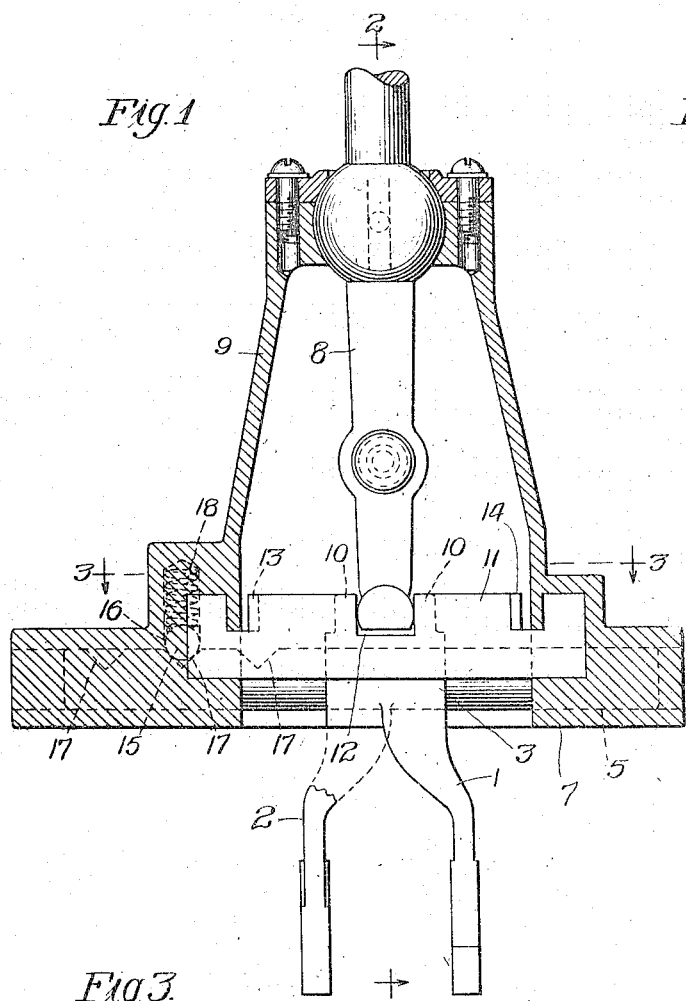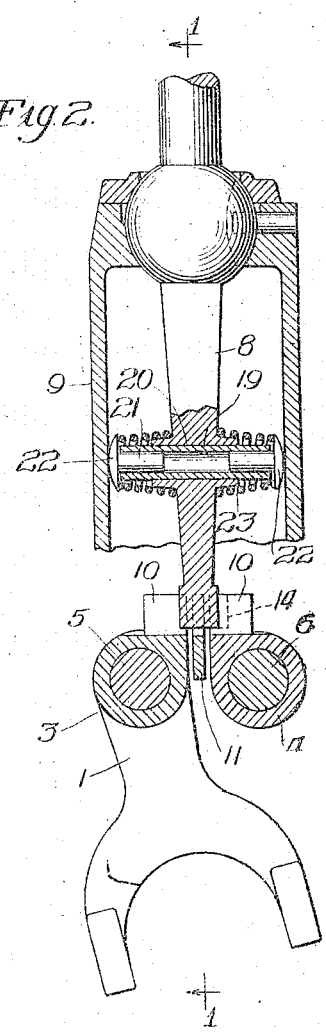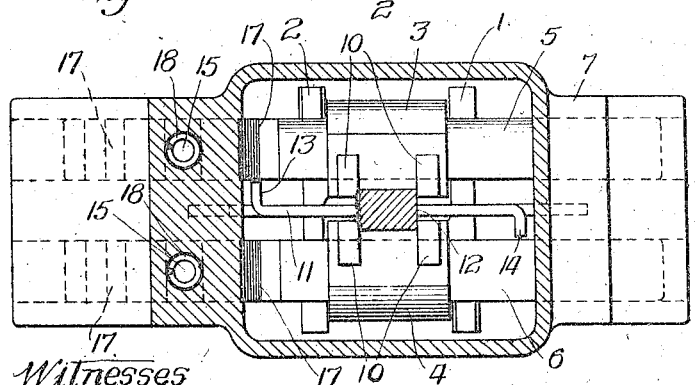

CARL E. SWENSON AND LEVIN FAUST, OF ROCKFORD, ILLINOIS, ASSIGNORS TO MECHANICS' MACHINE COMPANY, OF ROCKFORD, ILLINOIS, A CORPORATION OF ILLINOIS.

TRANSMISSION MECHANISM.

1,143,794.

Specification of Letters Patent.

Patented June 22, 1915.

Application filed June 22, 1914. Serial No. 846,428.

*To all whom it may concern:*

Be it known that we, CARL E. SWENSON and LEVIN FAUST, citizens of the United States, residing at Rockford, in the county of Winnebago and State of Illinois, have invented certain new and useful Improvements in Transmission Mechanism, of which the following is a specification.

This invention relates to change-speed transmission mechanisms for motor-driven vehicles, and particularly to the means for shifting the slidable gears of such mechanisms. In prior constructions it has been common to control the position of the operating lever by means of a plate through which the lever extended, said plate having slots in which the lever was moved in the operation of shifting the gears.

One of the objects of this invention is to dispense with such a plate and substitute therefor a simple locking element located adjacent to the transmission.

Another object of the invention is to provide means tending to restore the operating lever to neutral position.

In the accompanying drawings, Figure 1 is a vertical central sectional view taken in the plane of dotted line 1—1 of Fig. 2. Fig. 2 is a section on dotted line 2—2 of Fig. 1. Fig. 3 is a sectional view taken in the plane of dotted line 3—3 of Fig. 1.

In the drawings the transmission gears are omitted. 1 and 2 indicate the forks by means of which the gears are moved into and out of their various positions. Each of these forks has a collar 3 and 4, respectively, said collars being fixed upon parallel shifter rods 5 and 6. Said rods are mounted for longitudinal sliding movement in a casting 7 located adjacent to the transmission mechanism.

The shifter rods 5 and 6 are reciprocated by means of lever 8 mounted for universal pivotal movement in a housing 9 rising from the casting 7. The hand lever (not shown), by means of which the operator controls the transmission mechanism, may be connected in any suitable or well-known way to the upper end of the lever 8. The lower end of the lever 8 is adapted to lie between lugs 10 formed upon the collars 3 and 4.

In order that it shall not be possible to transfer the lever 8 from engagement with one shifter fork to the other until the first mentioned fork has been placed in neutral position, we provide a locking bar or plate 11 extending between the collars 3 and 4 and having a notch 12 therein for the reception of the lower end of the lever 8, said notch being centrally located with reference to the throw lever 8. The lower end of the lever 8 is of sufficient width or thickness to extend through the notch 11 and lie between the lugs 10 on both of the collars 3 and 4 and thus lock both of the shifter forks in neutral position.

Preferably the locking plate 11 consists of a sheet-metal stamping, the ends of which are embedded in the metal of the casting 7 in the operation of casting the latter. By this method of securing the locking plate in place the cost of manufacture is very materially reduced.

Each of the sliding gears of the transmission may have one definite stop (not shown) outside of the shifting mechanism, as usual, said stop limiting movement of the gear in one direction. Movement of the gear in the opposite direction is limited by means of a lug on the locking plate 11. Herein we have shown two lugs 13 and 14 struck up from the locking plate 11, the lug 13 being adapted to limit the movement of the collar 3 in one direction, while the lug 14 serves a similar purpose with reference to the collar 4.

To yieldingly hold the gears in adjusted position we have provided two locking balls 15, said balls being mounted in recesses 16 in the casting 7. The balls 15 are adapted to lie in notches 17 in the shifter rods 5 and 6. Springs 18 serve to hold the balls 15 in the recess 17.

If desired, means may be provided for automatically moving the lever 8 into the position shown in Fig. 2, after said lever has been moved to neutral position. The means herein shown for this purpose comprises a tube 19, said tube being slidable within a transverse opening 20 in the lever 8. In the opposite ends of the tube 19 are stems 21 having heads 22 to bear against the inner walls of the housing 9. Coiled springs 23 are interposed between the heads 22 and the sides of the lever 8. It will be seen that when the lever 8 is swung to one side of the housing 9, the spring at that side will be compressed, and that when the lever is released said spring will expand, thereby restoring the lever to central position.

Assuming the parts to be in the position shown in the drawings, the operation is as follows: If the operator desires to shift the gear which is controlled by the fork 1 he swings the lower end of the lever 8 to the left (Fig. 2) until said lever is clear of the locking plate 11. The operator then swings the lower end of the lever 8 to the left (Fig. 1) until one of the lugs 10 stops against the lug 13, thereby placing the gear in operative position. When the operator desires to place the other gear in operative position, he swings the lever 8 to central position, swings said lever through the notch 12, and then swings the lower end of the lever 8 to the right (Fig. 1) until the lug 10 stops against the lug 14.

While we have described the present embodiment of our invention in considerable detail, it will be understood that the invention is not limited to the precise construction shown, but that various modifications may be made without departing from the spirit and scope of the invention as defined by the appended claims.

We claim as our invention:

1. In a transmission, in combination, shifter elements, a housing, a lever mounted in said housing and movable in planes at angles to each other and adapted for swinging movement in one plane to engage either of said elements and for swinging movement in another plane to shift the element so engaged, and springs carried by said lever and provided with bearings at their ends against the housing, tending to hold the lever in central position, said bearings being slidable laterally across the wall of said housing as the lever is swung to shift said element.

2. In a transmission, shifter elements, a part in which said elements are movably mounted, a housing connected to said part, a lever mounted in said housing for universal movement, said lever being adapted to engage either of said shifter elements, and means carried by the lever and bearing against the opposite walls of said housing and movable laterally across the surface of said walls, said means tending to restore the lever to central position.

3. In a transmission, a pivotally mounted lever, a part extending slidably through said lever, heads at the opposite ends of said part, spring means interposed between each head and the adjacent side of the lever, and stationary parts against which said heads bear.

4. In a transmission, shifter elements, a hollow casting in which said elements are movably mounted, a lever adapted for engagement with either of said elements, and a locking plate for the lever, said locking plate extending across the casting and the ends of the plate being embedded in the walls of the casting, to support said plate in position, said locking plate having stops on opposite sides thereof bent up from the plate.

5. In a gear shifting device for transmissions, a base having a housing rising therefrom, the base having two pairs of bearings therein, two parallel shifter rods having their ends mounted in said bearings for sliding movement, two shifter elements each having a collar fixed on the central portion of one of said rods to slide therewith, said rods having notches therein, spring-pressed dogs mounted in the base and arranged to engage in said notches, a lever mounted for universal movement in a fixed bearing at the upper end of said housing, a locking plate disposed longitudinally between said shifter rods and having its ends cast into said base, said plate having stops bent up therefrom at opposite ends against which the collars of said shifter elements may abut, the plate further having a central notch adapted to receive the lower end of said lever, and a pair of lugs on each of said collars between which the lower end of the lever is arranged to engage for moving said shifter elements.

In testimony whereof we hereunto set our hands in the presence of two witnesses.

CARL E. SWENSON.
LEVIN FAUST.

In the presence of—
BERT E. ANDERSON,
IDA M. ANDERSON.